(12) United States Patent
Teymouri et al.

(10) Patent No.: US 12,479,301 B2
(45) Date of Patent: Nov. 25, 2025

(54) VEHICLE CONDITION DETECTION AND RESOLUTION

(71) Applicant: Rivian IP Holdings, LLC, Irvine, CA (US)

(72) Inventors: Armin Teymouri, Los Angeles, CA (US); Chia-Chou Yeh, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 219 days.

(21) Appl. No.: 18/341,511

(22) Filed: Jun. 26, 2023

(65) Prior Publication Data

US 2024/0424907 A1 Dec. 26, 2024

(51) Int. Cl.
*B60L 3/00* (2019.01)
*B60L 3/12* (2006.01)

(52) U.S. Cl.
CPC ............... *B60L 3/0061* (2013.01); *B60L 3/12* (2013.01); *B60L 2240/423* (2013.01); *B60L 2240/70* (2013.01); *B60L 2250/16* (2013.01)

(58) Field of Classification Search
CPC .... B60L 3/0061; B60L 3/12; B60L 2240/423; B60L 2240/70; B60L 2250/16
See application file for complete search history.

(56) References Cited

U.S. PATENT DOCUMENTS 5,754,965 A * 5/1998 Hagenbuch ............ G07C 5/008
701/33.9
2010/0131179 A1* 5/2010 Yoon ................ B60W 50/0205
701/104

\* cited by examiner

*Primary Examiner* — Gertrude Arthur Jeanglaude
(74) *Attorney, Agent, or Firm* — Foley & Lardner LLP

(57) ABSTRACT

Condition detection and resolution is provided. A system includes one or more processors of a vehicle, coupled with memory. The one or more processors can detect a condition of a motor of the vehicle. The one or more processors can select an action that reduces an amount of torque of the motor for a time interval. The selection can be based on the condition and a mode of operation of the vehicle. The one or more processors can perform the action to clear the condition of the motor without adjustment of the mode of operation of the vehicle.

18 Claims, 9 Drawing Sheets

| 702 ↓ / 704 → | 712 Maskable | 714 Slew | 716 History/Status Bit | 718 Max VDC Delay | 720 Action |
|---|---|---|---|---|---|
| 706 Inverter Desaturation | Fast | N/A | 00 | 1ms | Current Limit |
| 708 CAN Communication | Slow | 5 ms | 10 | 100ms | CAN Renegotiation/ Power Limit 0A |
| 710 Resolver Loss | No | N/A | 00 | N/A | Vehicle Halt |

VEHICLE CONDITION DETECTION AND RESOLUTION

INTRODUCTION

Electric vehicles can include monitoring systems. Such systems may detect conditions indicative of a potential state of the electric vehicle or a sensor thereof.

SUMMARY

This technical solution is generally directed to systems, methods and apparatus for vehicle condition detection and resolution. For example, there may be certain condition associated with an electric motor of a vehicle that may lack a hardware root cause and can be resolved via a reset process that can be executed while the vehicle is operating. This technical solution can detect a condition, classify the condition as being compatible or resolvable with the reset process, and then execute the reset process while the vehicle is operating without perceptibly impacting operation of the vehicle or providing an indication to a vehicle controller.

At least one aspect is directed to a system. The system can include one or more processors of a vehicle, coupled with memory. The one or more processors can detect a condition of a motor of the vehicle. The one or more processors can select an action that reduces an amount of torque of the motor for a time interval. The selection can be based on the condition and a mode of operation of the vehicle. The one or more processors can perform the action to clear the condition of the motor without adjustment of the mode of operation of the vehicle.

At least one aspect is directed to a method. The method can be performed by one or more processors, coupled with memory, of a vehicle. The method can include detecting a condition of a motor of the vehicle. The method can include selecting based on the condition and a mode of operation of the vehicle, an action that reduces an amount of torque of the motor for a time interval. The method can include performing, by the one or more processors, the action to clear the condition of the motor without adjustment of the mode of operation of the vehicle.

At least one aspect is directed to an electric vehicle. The electric vehicle can include one or more processors, coupled with memory. The one or more processors can detect a condition of a motor of the electric vehicle. The one or more processors can select, based on the condition and a mode of operation of the electric vehicle, an action that reduces an amount of torque of the motor for a time interval. The one or more processors can perform the action to clear the condition of the motor without adjustment of the mode of operation of the electric vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 7 depicts an example condition-action lookup table (LUT).

DETAILED DESCRIPTION

Figure 1:
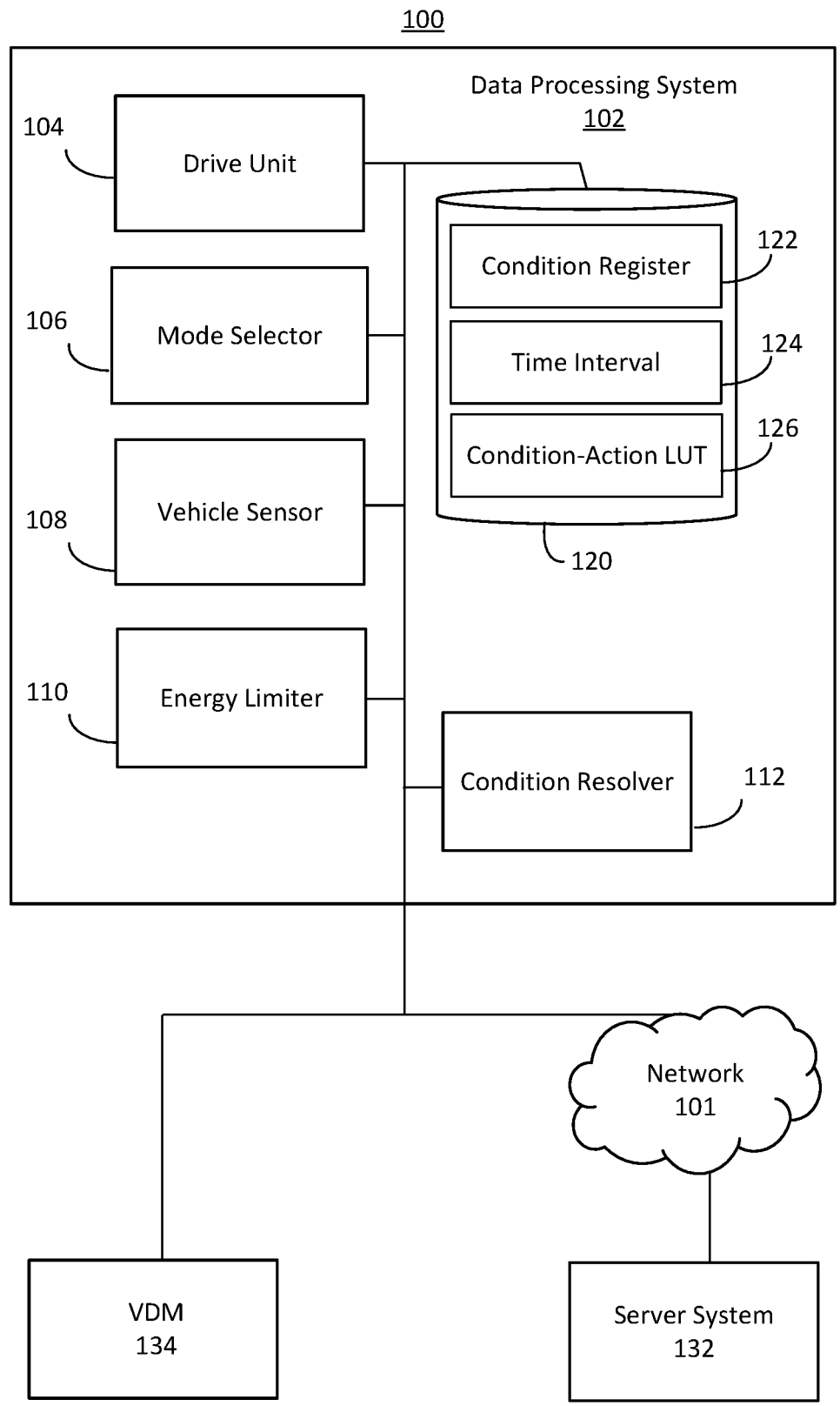
FIG. 1 depicts an example block diagram of a condition detection and resolution system.

Following below are more detailed descriptions of various concepts related to, and implementations of, methods, apparatuses, and systems of condition detection and resolution. The various concepts introduced above and discussed in greater detail below may be implemented in any of numerous ways.

This disclosure is generally directed to condition detection and resolution. There are certain motor conditions that can be caused by noise and may not have a real hardware root cause. These conditions can be detected, classified, or resolved with a power supply reset which is done when the vehicle reset is performed. However, such resets can interrupt vehicle operation and provide an indication to a user which may not be accurate. Resolving the condition (e.g., clearing the condition or determining the condition is not cleared) prior to other actions may reduce interruptions to vehicle operation or presentations of spurious data to a user. The disclosed systems can take an action such as a torque limit, resolve a condition, and maintain vehicle operation if resolution of the condition is clearable (e.g., caused by noise). The vehicle can retain a record of a previous condition in a condition register such that the condition and resolution can be conveyed to a remote device for diagnostic purposes. A frequently recurring condition can be indicative of a non-clearable condition.

This technical solution is directed to a data processing system that determines one or more conditions and classifies those one or more conditions as clearable via a reset process that can be executed while the vehicle is in operation without impacting or adjusting operation of the vehicle. For example, the conditions may be selected according to a masking not deteriorating a condition within a predetermined time interval, which can be resolved within the predetermined time interval, or which are associated with electro-magnetic noise, miscommunication, or false measurements.

This technical solution can continue vehicle operation responsive to such conditions without notifying the driver, VDM, or changing the vehicle behavior (e.g. speed). A clearable condition can (1) resolve the condition, (2) prevent notification to the driver or VDM, (3) prevent a vehicle stop or other interruption of operation, (4) prevent a loss of torque greater than a predetermined interval (e.g., a perceptible loss, a loss which is relevant to vehicle handling, or a loss that is within a tolerance or predetermined standard or threshold).

A condition can correspond to a detection of, for example, an overcurrent event of a motor or inverter of a vehicle. The detection of the condition may be a preliminary or initial indication which may differ from a subsequently detected condition. For example, the indication of the overcurrent event may correspond to a transient condition or electrical noise associated with a sensor, which may thereafter be resolved based on further measurements. An indication of a condition can be associated with a removal of energy such as a reduction of an amount of torque of the motor. The energy can be removed within a first time interval less than a time to resolve the condition. For example, the first time interval may be configured to avoid deterioration of the condition, such as where the overcurrent event causes a thermal limit to be exceeded. However, where the condition corresponds to, for example, a transient condition or noise, the energy limit can be removed within a time period that may not be relevant to a vehicle operation, or to a vehicle dynamics module (VDM). The condition can be checked and resolved without providing an indication to the VDM. In vehicles including multiple motors, the removal or reapplication of energy of the motor may be synchronized with other motors (e.g., front and rear or left and right) to avoid asymmetrical operating conditions. Upon a resolution of the condition indicating the removal of energy will persist longer than a second time interval, or an expiration of a second time interval, an indication of the condition may be conveyed to the dynamic control module, which may present the indication to a user or take another action.

FIG. 1 depicts an example system 100 of condition detection and resolution. The system 100 can include, interface with or otherwise communicate with a data processing system 102 of an electric vehicle. The system 100 can employ a network 101 to exchange information with the data processing system 102 of the electric vehicle or a server system 132, such as a server system 132 disposed remote from the data processing system 102. The data processing system 102 can be part of, hosted by, or otherwise integrated with a component of the electrical vehicle. The system 100 can include, interface with or otherwise communicate with the server system 132 via the network 101. The network 101 can include computer networks such as the Internet, local, wide, metro, or other area networks, intranets, cellular networks, satellite networks, and other communication networks such as Bluetooth, or data mobile telephone networks. The network 101 can be public or private. The various elements of the system 100 can communicate over the network 101.

The server system 132 can refer to or include a cloud computing environment with one or more servers. The server system 132 can receive information from the data processing system 102 of the vehicle, or provide information to the data processing system 102 of the vehicle. For example, the server system 132 can receive information indicative of a state of the vehicle, such as by receiving information of the condition register 122. The server system 132 can provide over-the-air software updates to the data processing system 102 of the vehicle. The server system 132 can facilitate the performance of resolution of conditions of the vehicle, such as by providing an update to the time intervals 124 or condition-action look-up table 126. The updates can be responsive to condition information received from one or more vehicles, such as condition register 122 information received from various instances of data processing systems 102.

The data processing system 102 can include or be part of a vehicle. The data processing system 102 can include or interface with at least one drive unit 104 such as an electric motor, inverter, or combination thereof. The data processing system 102 can include at least one mode selector 106. The data processing system 102 can include at least one vehicle sensor 108. The data processing system 102 can include at least one energy limiter 110. The data processing system can include at least one condition resolver 112. The data processing system 102 can include at least one data repository 120. The drive unit 104, mode selector 106, vehicle sensor 108, energy limiter 110, or condition resolver 112 can each include at least one processing unit or other logic device such as programmable logic array engine, or module configured to communicate with the vehicle data repository 120 or database. The drive unit 104, mode selector 106, vehicle sensor 108, energy limiter 110, or condition resolver 112 can be separate components, a single component, or part of the data processing system 102. The data processing system 102 can include hardware elements, such as one or more processors, logic devices, or circuits. For example, the data processing system 102 can include one or more components or structures of functionality of computing devices depicted in FIG. 9.

The data repository 120 can include one or more local or distributed databases, and can include a database management system. The data repository 120 can include computer data storage or memory and can store one or more data structures, such as a condition register 122, time interval 124, or Condition-Action LUT 126.

A condition register 122 can refer to or include one or more memory storage locations for including information indicative of a current or previously detected condition of a vehicle. References to conditions can refer to one or more condition types. For example, an overcurrent condition type can refer to conditions of a detection of a first, second, or third value which exceeds a predefined threshold according to a same classification. Some types may be classified based on a type of multiple conditions. For example, a loss of signal or loss of track of a resolver can be classified as a same condition type (e.g., resolver data condition). References to a condition can refer to a condition type or to a particular condition. For example, the condition can include a bit flag indicative of a value that is not within a predefined range, a value such as temperature, current, voltage, speed, or communication status. The value of the condition register can include persistent, spurious, or transient conditions. For example, an indication that a motor temperature is at −255° C. immediately following or preceding another indication that the same motor is at a temperature of 42° may be indicative of a corrupted data packet or other spurious condition. The condition register 122 can include a predefined location corresponding to a particular condition, or another data structure (e.g., may include a circular buffer). The condition register 122 can include information related to the condition such as a time of detection, a previous or subsequent measurement, or an associated condition or measurement (e.g., a wheel speed sensor corresponding to a motor frequency). The condition register can store historical data which may be conveyed to a server system 132. The condition register 122 can be accessible via one or more data structures, such as by the condition-action LUT 126.

A time interval 124 may refer to or include a predefined amount of time for resolution, detection, or classification of a condition. For example, the time interval 124 can include a minimum time to respond to a condition (e.g., to reduce a risk of overheating, arcing, or current overload). The time interval 124 can include a time to determine or verify a status or a condition. For example, determining a status or condition can include settling time for a sensor, or a series of readings which are averaged, smoothed, or otherwise processed to reject spurious data such as the contributions of noise to a measurement circuit. Some time intervals 124 associated with determining or verifying a status of a condition may exceed a time interval 124 to resolve the condition. For example, it may be desirable to take an action in response to inverter desaturation within about 50 µS, but a time to validate the condition can be greater than 50 µS (e.g., 5 or 50 milliseconds).

A condition-action LUT 126 can refer to or include a data structure associating each of one or more conditions with at least one corresponding action. For example, the conditions can include the various conditions of the condition register 122. Actions can include logging an indication of an observed condition, providing an indication to a user, or limiting energy to an electric motor. For example, limiting energy can include a zero or non-zero current limit, three-phase short of the electric motor (e.g., to reduce torque of the motor), logical or mechanical disconnection of the motor from a battery, or inhibiting one or more modes of operation (e.g., regenerative breaking). The condition-action LUT 126 can associate different actions depending on various modes of vehicle operation or vehicle speeds. For example, when the vehicle is in a run state, the vehicle can respond to a condition with a first action, and respond to the condition with a second action when the vehicle is in a standby state.

The condition-action LUT 126 can include an indication of whether or when a condition is reported to a vehicle dynamic control module 134. For example, the condition-action LUT 126 may include an indication that some conditions are maskable (e.g., not immediately reportable to the VDM 134), wherein a condition may be resolved such as by resetting a portion of a controller or allowing a measurement to settle. The condition-action LUT 126 may include an indication that a condition is non-maskable (e.g., immediately reportable to the VDM 134). The condition-action LUT 126 can indicate that a condition is maskable for one time interval, but not maskable where the condition is not resolved prior to another time interval. For example, a maskability may be associated with a maximum time interval, such as 85 or 195 milliseconds.

The data processing system 102 can include or interface with one or more drive units 104 of an electric vehicle. The drive unit 104 can include an electric motor which is electrically coupled to a battery. For example, the drive unit 104 can include an inverter electrically coupling the battery to the electric motor. An electric vehicle can include more than one electric motor. For example, a vehicle can include one motor per an axle or one motor per wheel. Electric motors can couple to a plurality of wheels or axles through a differential. Each electric motor can be coupled to a battery via a separate inverter. An inverter can interface with the electric motor through an output port, such as via a switching component of the inverter. The inverter can invert the DC battery energy to an AC signal having any number of phases. For example, an inverter can contain one or three phases for a one or three phase AC motor.

A reduction to an amount of torque of the motor may refer to or include providing less current or power to the motor such that the motor exerts less torque or force. The provision of the power can be conveyed via a controller for a motor, inverter, or battery. For example, the energy limiter controller can ramp down the torque of the motor to reduce the amount of power drawn from the battery. A reduction to an amount of torque of the motor can be executed by reducing energy provided to the electric motor. Such reductions can be particular to one motor of an electric vehicle, or may be applied to multiple motors. A message provided to an inverter can cause a reduction (or increase) of energy provided to one or more electric motors. Various vehicles may include various drive units 104. For example, a first electric vehicle can include four wheels and four corresponding drive units 104 including electric motors. The motors may be referred to as a front right motor (MFR), front left motor (MFL), rear right motor (MRR), or rear left motor (MRL). A second electric vehicle can include an internal combustion engine to drive a front axle and an electric motor to drive the rear axle.

The data processing system 102 can include a mode selector 106 configured to transition the vehicle between one or more modes. For example, the mode selector 106 may determine an active mode based on one or more inputs to select an active state of a finite state machine (FSM) or another mode selection data structure or circuit. Various illustrative examples herein refer to the mode selector 106 as determining states (e.g., of a state machine). Such examples are not limiting. For example, the modes may refer to, correlate with, or be implemented as various flags, behavior trees, or event-driven responses. The mode selector 106 can select a mode for various vehicle states such as an off mode, a standby mode, a pre-run mode, a run mode, or a power down mode. The mode selector 106 can select a mode based on inputs from an autonomy system, or a vehicle sensor 108, such as a vehicle sensor 108 indicative of a user input (e.g., a position of an acceleration or brake pedal), or of a vehicle condition (e.g., a temperature or current sensor associated with a drive unit 104).

The mode selector 106 can adjust a mode or state of the vehicle responsive to a determination of the condition resolver. For example, the mode selector 106 can adjust the mode corresponding to a condition which is reported to the VDM 134. The mode selector can cause a mode adjustment responsive to an indication, from the condition resolver, that a condition is retriable.

The data processing system 102 can include, interface with or otherwise communicate with one or more vehicle sensors 108. The vehicle sensors 108 can include a sensor indicative of one or more conditions of a vehicle. For example, a vehicle sensor 108 can detect or classify a condition of a motor of the vehicle. The vehicle sensors 108 can determine a voltage or current to detect the condition of the motor. For example, the vehicle sensors 108 can include shunt resistors, hall-effect sensors, thermistors, or current transformers. Sensors can monitor, one or more batteries, inverters, electric motors, or the like. The sensors 108 can detect a condition indicative of inverter desaturation, overvoltage, under voltage, over-temperature, or so forth. Sensors can include transceivers configured to communication with mechanical components such as rotating devices (e.g., resolvers). The resolvers can indicate a speed, position, or other information regarding a rotation. A condition may be indicative of communication with a sensor 108 or monitored component. For example, a controller can lose communication with a resolver or other sensor (e.g., fail to convey information, transmit a heartbeat, or engage a pull-up or pull-down resistor). A resolver or other sensor 108 can indicate a loss of communication with a monitored component. For example, a resolver can convey an indication of a failure to detect a magnetic or electrical signal corresponding to a rotor or wheel speed indicator.

It is noted, that sensors 108 can detect information associated with various devices, and may vary in operation according to device operation. For example, a sensor 108 associated with a power management integrated circuit (PMIC) can include a watchdog timer to sense a failure to service a watchdog, or a voltage sensor to detect a deviation from a predetermined output range. A sensor 108 associated with a field programmable gate array (FPGA) can detect a checksum deviation from an expected checksum for a configuration memory.

The various sensors 108 can be associated with corresponding settling times. For example, a sensor 108 can provide an initial indication of a condition, and thereafter provide a subsequent indication upon a completion of a settling time. For example, the initial indication can be a single "snapshot" measurement, and the subsequent indication can be a time average including or subsequent to the "snapshot" measurement. The settling time may include an action taken, such as resetting a controller or portion thereof. For example, upon receiving an initial indication, a counter, accumulator, or other circuit portion can be cleared or reset (e.g., by the condition resolver 112), wherein a subsequent settled indication can be indicative of a second measurement subsequent to the clearance or reset. The clearance may not adjust a mode of operation of a vehicle, such as a perceptible change of mode. For example, the clearance may not be relevant to vehicle power delivery or dynamic control.

The data processing system 102 can include, interface with or otherwise communicate with one or more energy limiters 110. The energy limiter 110 can select an action that reduces the amount of torque of the motor of the vehicle. The selection can be based on, for example, the condition and a mode of operation of the vehicle. The mode of operation can be a discrete mode, or a mode as perceptible to an occupant. For example, a perception of continual power delivery may correspond to an operating state, where operation may be non-continuous such as due to a pulse width modulation signal or other state or mode transition of a vehicle control system less than a perceptible time (e.g., 50 milliseconds). Energy limiters 110 can include overvoltage protection circuits, which are sometimes referred to as crowbars. Energy limiters 110 can include or cause the ramp down of motor torque, or disconnection switches such as a battery disconnect switches between a battery and an inverter or motor. Energy limiters 110 can include mechanical, electro-mechanical, or electrical relays or switches connecting an electric motor to a battery which can be opened to remove energy from the electric motor. Energy limiters 110 can limit energy to one or more portions of an electric vehicle prior to a resolution of a condition. The energy limiter 110 can limit energy to an electric motor upon an indication that the electric motor is undergoing a condition associated with an action of power limiting according to the condition-action LUT 126. For example, a sensor 108 having a settling time of 3 milliseconds may indicate that a first 5 μs of data is indicative of such a condition associated with removal of all power to the motor. The energy limiter 110 can remove power from the motor upon the receipt of the indication. Thereafter, the energy limiter 110 can maintain the removal or power or reintroduce the power responsive to an indication from the condition resolver 112.

Energy limiters 110 can include switching modes of an inverter. The inverter can control the motor speed or torque based on the current passed to the electric motor. For example, the inverter can increase current to cause an increase of torque or decrease current (e.g., impose a current limit) to decrease torque. The energy limiter 110 can cause the inverter to actuate various switches to dissipate energy as thermal energy. For example, the inverter can actuate various switching component between various windings of the electric motor to cause a current to pass through windings of a plurality of phases of the electric motor (e.g., to engage a short circuit state). The inverter can introduce current to an electric motor in a thermal operation envelope, wherein the current of the electric motor generates thermal energy with no motive effort, or insubstantial motive effort (e.g., motive effort which is inadequate to propel the electric vehicle). Operation of one or more electric motors in the thermal operation envelope can be referred to as a current injection state or mode, or as an active discharge.

Energy limiters 110 can limit or reapply energy according to an immediate or slewed application or removal. For example, switches of an inverter can be adjusted in phase over time to remove or (re)introduce power to a drive unit 104 gradually. The gradual reintroduction of energy may aid vehicle dynamics, such as by avoiding abrupt changes in power delivery which can unsettle a vehicle dynamically, particularly, when the vehicle is at a limit of traction such as on ice, in an apex of a corner, or so forth. Energy limiters 110 can be employed on a per-motor, per-axel, or per-vehicle basis. For example, an energy limiter 110 can apply an energy limit to a left electric motor of an axle, and not to a right electric motor of the vehicle, or the left and right electric motor. The energy limiter 110 can limit energy to a first axle, but not to a second axle, or to both axles.

A condition resolver 112 can resolve a condition associated with a motor of an electric vehicle. Condition resolution may refer to or include determining that a condition persists (e.g., that an initial indication of a condition corresponds to a subsequent indication of the condition), or does not persist. The condition resolver 112 can determine an action clears the condition of the motor. For example, the clearance may be for a time interval which is greater than a threshold (e.g., one second or one week). The condition resolver can prevent transmission of a notification of a condition to a vehicle occupant such as a driver or to a VDM 134. For example, the condition resolver 112 can prevent the transmission responsive to a determination that the condition is maskable, and that the condition does not recur prior to the clearance threshold, above. The condition resolver 112 can provide a log of the condition or its detection, classification, or resolution to the server system 132. The log can indicate a resolved condition that was or was not indicated to the VDM 134. For example, the condition resolver 112 can determine that an action fails to clear the condition within a time interval, and provide a notification of the condition to a driver or the VDC module. The condition resolver 112 can determine the action fails to clear the condition if the condition persists after the action and during the time interval or a subsequent time interval.

The condition resolver 112 can synchronize various drive units (e.g., motors) of an electric vehicle. For example, responsive to determining an energy limit applied to a first motor, the condition resolver can determine a second motor lacks a condition detected with the first motor (e.g., the condition is absent or excluded with regard to the second motor; the second motor is without the condition), and can perform a same action on the first and second motors synchronously. Lacking a condition can refer to or be indicated based on a non-detection of a condition, or a detection of information which is indicative of an absence of the condition. Synchronously refers to coordination in time, such as proximal operations, but need not begin and end at a same moment in time.

A vehicle dynamic control module 134 may be or include a vehicle dynamic control circuit to control vehicle handling, such as based on an anti-lock brake system, a traction control system, or a vehicle dynamics control system. Receipt of a condition, by the vehicle dynamic control module 134 may correspond to an action such as a presentation to a user or a change of a mode to a vehicle (e.g., shutoff). The data processing system 102 can determine a first portion of conditions that are maskable (e.g., that the condition resolver 112 may resolve without communication to the vehicle dynamic control module 134). The vehicle dynamic control module 134 can receive an indication of a maskable condition after a passage of a predetermined time interval. The vehicle dynamic control module 134 can receive an indication of a non-maskable condition upon its detection. The vehicle dynamic control module 134 can present an indication of the condition to a user (e.g., via a dash light or buzzer), or disable operation of a vehicle upon receipt of a maskable or non-maskable condition.

Figure 2:
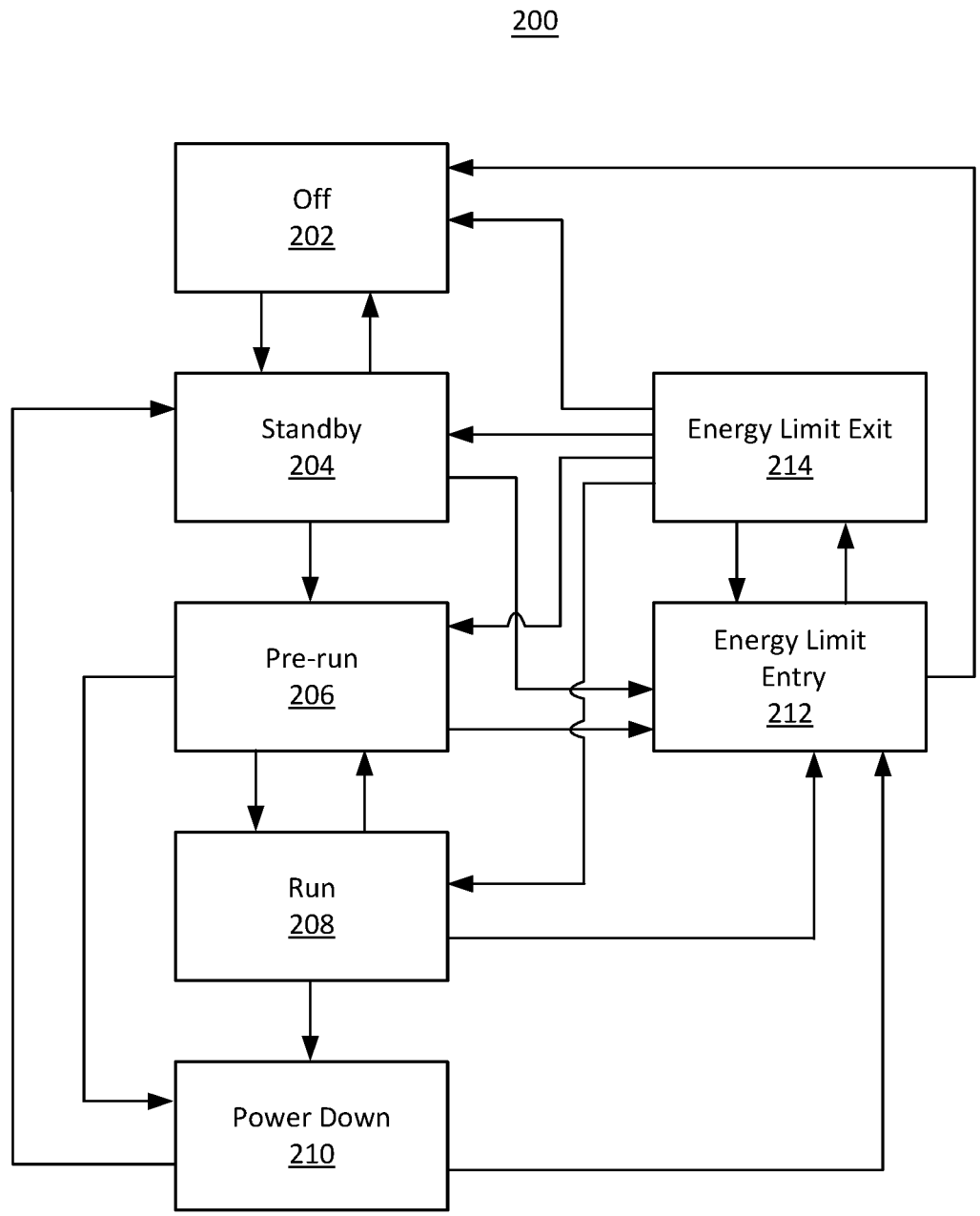
FIG. 2 depicts an example state machine diagram for condition detection and resolution.

FIG. 2 depicts an example state machine diagram 200 for condition detection and resolution. The transitions corresponding to the state machine 200 can be performed by one or more system or component depicted in FIG. 1, FIG. 3 or FIG. 9, including, for example, a data processing system 102 or vehicle. In some cases, some states may be replaced by flags or other indications. For example, State 212 and State 214 may be so replaced such that a state is maintained according to the navigation through, for example, state transitions State 208 to 212; 212 to 214; and 214 to 208.

State 202 corresponds to an off mode of the vehicle. The off mode may correspond to a reduction in power use, and an implementation of one or more vehicle security settings, such as restricted actions which are taken by a vehicle occupant or sounding an alarm upon receiving a user input. From State 202, the vehicle can transition to a standby state, State 204 upon a remote engagement, or an entry of a user with a key fob, for example.

State 204 can correspond to a standby mode of the electric vehicle. For example, the standby mode may disable an alarm, enable some electronic features such as battery preconditioning, climate control preconditioning, radio use, headlights, or otherwise cause the vehicle to provide some features. The standby mode may be referred to as an "accessory" mode. From State 204, the vehicle can transition to State 212, an energy limit state. The transition may be responsive to a detection of a condition of a battery or motor. Following a transition from State 204 to State 212, a vehicle may continue to remain in the standby mode. From State 204, the vehicle can transition to State 206, a pre-run state. For example, an occupant or an autonomy system may engage a pushbutton start or other indication to enter an operating mode. From State 204, the vehicle can transition to State 202, such as in response to a vehicle occupant turning the vehicle off from a mobile application, pushbutton start control, or the like.

State 206 can correspond to a pre-run mode. The pre-run mode can include vehicle operations such as vehicle systems other than an electric motor or inverter. For example, turn signals, window controls, power brakes or steering, and so forth may be available. From State 206, the vehicle can transition to State 208. For example, engaging an accelerator pedal or an input from an autonomy system may cause the vehicle to transition to state 208. From State 206, the vehicle can transition to State 212. For example, responsive to a detected condition of the drivetrain, the vehicle can transition to State 212. Following a transition from State 204 to state 212, a vehicle may continue to remain in the pre-run mode.

State 208 can correspond to a run mode. The run mode can include a vehicle undergoing motion. For example, the vehicle can provide power to or from the electric motors in the run mode. From State 208, the vehicle can transition to State 206, such as in response to a vehicle coming to a halt, such as at a traffic signal or congested road. From State 208, the vehicle can transition to State 210, such as upon detection of a condition which is not indicative of transitioning to State 212, such as a detection of flashover, a crowbar activation, or a loss of communication with a resolver. From State 208, the vehicle can transition to State 212. For example, responsive to a detected condition of the drivetrain, the vehicle can transition to State 212. Following a transition from State 208 to state 212, a vehicle may continue to remain in the run mode.

At state 210 a contactor can open between a battery (e.g., a main or propulsion battery) and other vehicle components, such that various vehicle features may unavailable. The state can correspond to a power down mode which can include limited user function, or can continue to correspond to a run mode or pre-run mode. For example, the state can transition into and out of the state while maintaining some user functions via an accessory circuit such as a circuit powered by a 12 volt battery. In some cases, the vehicle can transition into and out of state 212 quickly enough that a transition (e.g., loss of power) may not be perceptible or relevant to a user. From State 210, the vehicle can transition to state 212. For example, an energy limiter 110 can cause energy to be limited, such as by engaging a three-phase short of the electric motor. From State 210, the vehicle can transition to state 204.

At state 212, an energy limiter 110 can limit energy to one or more motors. The energy limiter 110 can limit or reduce the amount of power provide by or removed from a propulsion battery. The energy limiter 110 can maintain the limit until a condition resolver 112 resolves a condition associated with the transition to State 212, for example, the condition resolver 112 can indicate that the resolution of the condition corresponds to remaining in State 212 (e.g., for a latched condition). From state 212, the vehicle can transition to state 202, (e.g., for a condition that may be resolved by a vehicle restart). From State 212, the vehicle can transition to State 214, such as based on an entry condition. For example, a predetermined set of entry conditions may be associated with a transition to state 214 (e.g., entry conditions associated with sensors having a settling time in excess of a response time, such that the condition resolver 112 determines a condition is retrial). From state 214, the vehicle can transition to State 212, responsive to a continued detection of the entry condition to State 212 from any of States 204, 206, 208, or 210. The condition resolver 112 can increment counter upon such a transition, such that upon a predefined number or such transitions (e.g., one transition, three transitions, or 100 transitions), the condition resolver 112 can latch the vehicle into State 212. From state 214, the vehicle can return to an entry state (e.g., in response to the condition resolver 112 determining that the condition associated with entering State 212 was spurious or otherwise clearable). In some cases, from state 214, the vehicle can determine to go to state 210 to power down.

Figure 3:
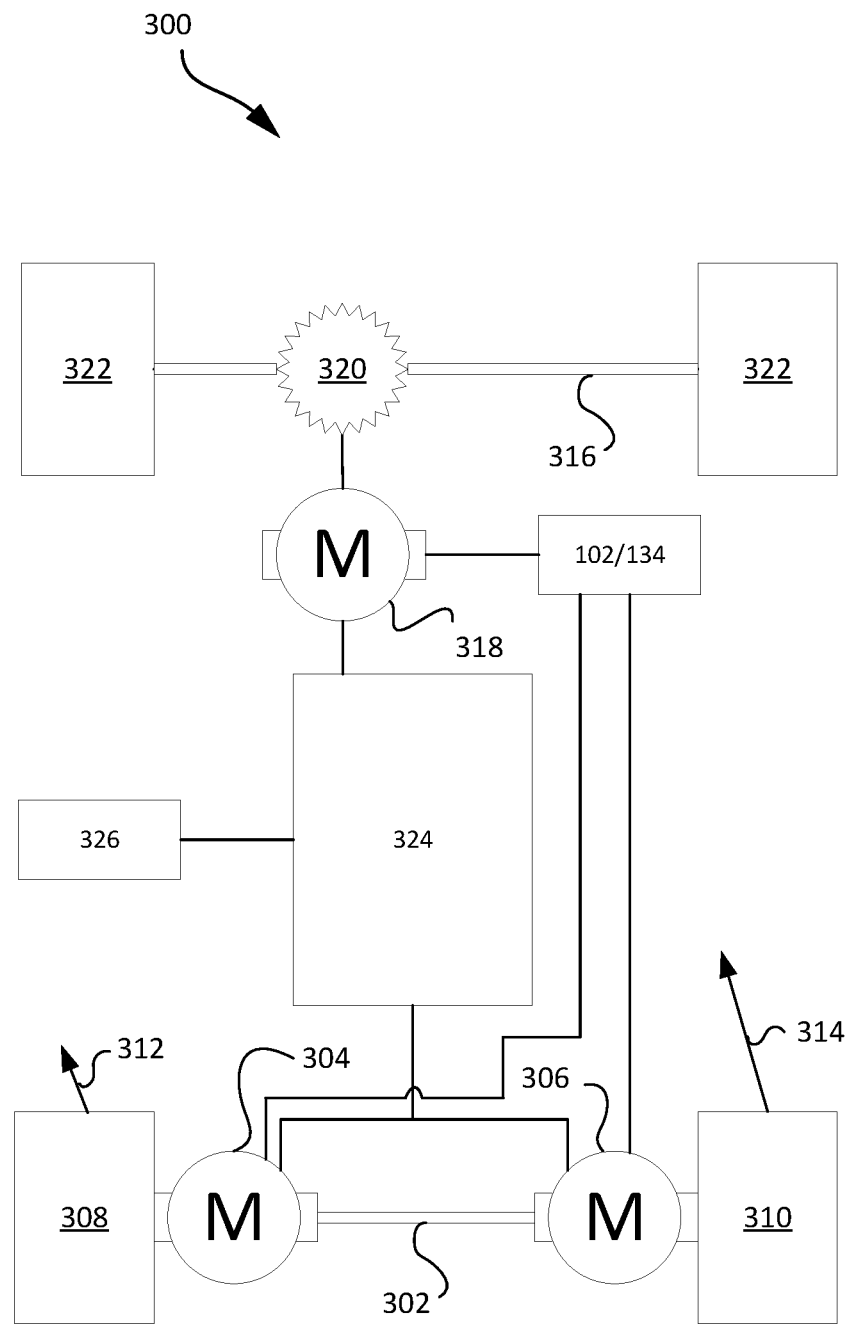
FIG. 3 depicts an example electric vehicle.

FIG. 3 depicts an example electric vehicle 300. Electric vehicles 300 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The electric vehicles 300 can interface with a surface through at least on wheel, track, propeller, or other interface. Electric vehicles 300 can be fully electric or partially electric (e.g., plug-in hybrid) and further, electric vehicles 300 can be fully autonomous, partially autonomous, or un-crewed. Electric vehicles 300 can also be human operated or non-autonomous. Electric vehicles 300 such as electric trucks or automobiles can include on-board battery packs, such as a main or propulsion battery pack 324, along with one or more accessory battery packs 326 or circuits. The accessory battery packs 326 or circuits can power user displays, controls, radios, and so forth.

The electric vehicle 300 can include a rear axle 302. The rear axle 302 can include a left rear motor 304 (MRL) and right rear motor 306 (MRR) to drive a corresponding left rear wheel 308 and right rear wheel 310. The energy limiter 110 can interface with the left rear wheel and the right rear wheel. For example, upon a detected condition associated with the left rear motor 304, the energy limiter 110 can reduce an amount of torque of the motor for a time interval 124, which may in turn, cause a difference in a rotation of the rear wheels 308, 310.

As depicted by the force corresponding force vectors 312, 314 of the rear wheels, the difference in rotation may be relevant to vehicle handling. A time interval 124 which is greater than a first threshold may result in vehicle rotation, thus, the energy limiter 110 can cause the right rear motor 306 to reduce an amount of torque of the right rear motor 306 for the time interval 124. Further, a time interval 124 which is greater than a second threshold may result in perceptible changes to acceleration, and may be reported to a vehicle dynamics controller module 134 interfacing with the data processing system 102. For example, given a "short," "medium" and "long" duration condition, which are merely referenced in duration relative to each other and not to another part of this disclosure, a "short" duration time interval can result in an energy limit applied to a single motor without reporting to the VDM 134. A "medium" time interval may result in a synchronized energy limit applied to multiple motors without reporting to the VDM 134. A "long" time interval may result in notification of the VDM 134.

A front motor 318 can be coupled to a front axle 316 (such as through the depicted differential 320) to a pair of front wheels 322. A condition or state of the front motor 318 may correspond to the second threshold. Another threshold can correspond to a condition or state associated with the front axle 316 and not the rear axle 302, or the rear axle 302 and not the front axle. Various electric vehicles can employ various configurations of electric motors. For example, some electric vehicles 300 may employ one or more electric vehicle per wheel, or one electric motor for the electric vehicle 300.

The electric vehicle 300 can include one or more network interfaces (e.g., wired or wireless transceivers) to connect to a remote server such as the server system 132 of FIG. 1. For example, the electric vehicle 300 can provide indications of a condition or state to the remote server via the network interfaces. For example, the network interface can connect to a cellular, WiFi, or Bluetooth network. The electric vehicle 300 can convey indications, to the server system 132, of states or conditions which are or are not conveyed to the VDM 134. The references to the remote server are not intended to be limiting the vehicle can include various local logs. For example, the local logs may be analyzed to adjust operation (e.g., a repeated spurious fault may be indicative of a vehicle servicing appointment).

Figure 4:
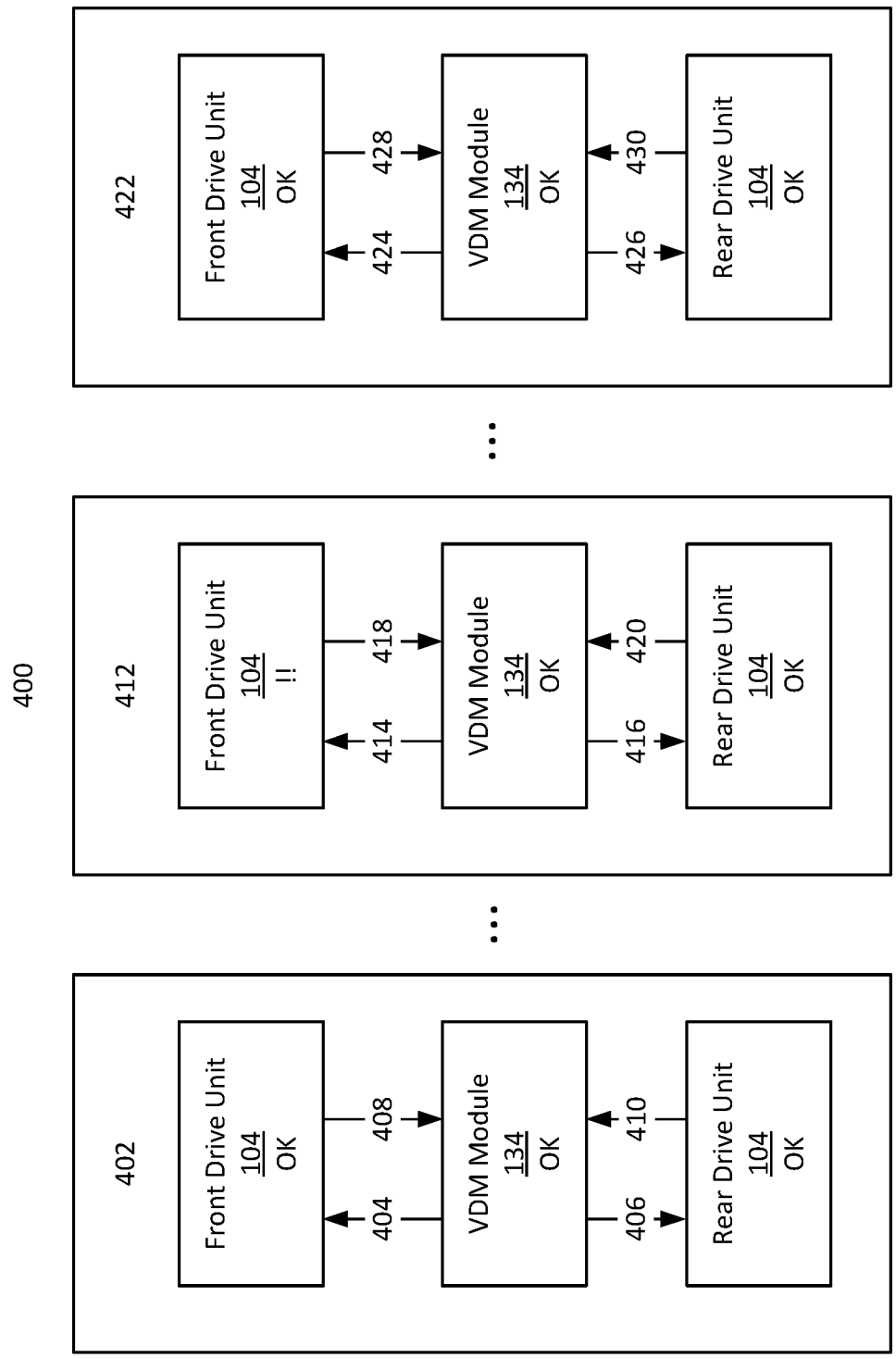
FIG. 4 depicts an example flow diagram for condition detection and resolution for various components of an electric vehicle.

FIG. 4 depicts an example flow diagram 400 for condition detection and resolution for various components of an electric vehicle. The flow diagram 400 indicates a condition resolution which indicates a clearance of a maskable condition.

At a first time 402, the vehicle can operate prior to detection of a condition. For example, responsive to sensed conditions or user inputs (e.g., steering angle sensor, accelerator pedal position, or autonomy system output), the VDM 134 can provide a first indication 404 to the front drive unit 104 including an amount of torque to generate, and a second indication 406 to the rear drive unit 104 including an amount of torque to generate. Responsive to the first and second indication, each of the front drive unit 104 and the rear drive unit 104 can generate a same or different amount of torque to propel the vehicle at a desired speed with desired handling characteristics. Each of the front drive unit 104 and the rear drive unit 104 can convey an indication of a status (e.g., the depicted third indication 408 and fourth indication 410) to the VDM 134. For example, the indication can include an affirmation of a command, include a heartbeat or other indication of responsiveness, or a lack of an indication of a presence of a condition or fault.

At a second time 412, the electric vehicle 300 can detect or classify a condition. For example, the detected condition can be detected at the front drive unit 104 (e.g., an overcurrent event which may be indicative of a noisy sensor or a short circuit). The VDM 134 can provide a fifth indication 414 to the front drive unit 104 including an amount of torque to generate, and a sixth indication 416 to the rear drive unit 104 including an amount of torque to generate. The fifth indication and sixth indication 416 can be the same or different from the first indication 404 and the second indication 406, or vary according to, for example, a traction control system or user input. An energy limiter 110 which is communicatively connected to the front drive unit 104 can, responsive to the detection of the condition, limit a torque output (e.g., to 0 Nm). The front drive unit 104 can convey a seventh indication 418 to the VDM 134 which is not indicative of the condition (e.g., can mask the condition). The rear drive unit 104 can generate a requested torque responsive to the sixth indication 416, and provide an eighth indication 420 of a status to the VDM 134. Thus, at the second time, a condition can be detected, an action such as torque limiting can be implemented, and the status can be masked.

At a third time 422, the condition resolver 112 can determine that the condition is maskable (e.g., that the overcurrent event is not indicative of a short circuit). For example, the condition resolver 112 can receive settled sensor data, or the condition can fail to reoccur after resetting or clearing a controller or portion thereof (e.g., within a predefined time). Responsive to the resolution of the condition, the condition resolver 112 can cause the removal of the energy limit. For example, the condition resolver 112 can cause the energy limiter 110 to remove the energy limit, such as by slewing energy provided to the electric motor to cause torque to gradually return. The condition resolver 112 can determine whether to slew the return of energy based on a difference between a current torque output of the motor and a torque requested by the VDM 134, or a time which has passed since the energy limit was imposed. For example, for some times (e.g., a time less than 50 μs), a torque output of a motor may not substantially change after a commanded reduction based on rotor inertia or electric field reduction in the electric motor. The VDM 134 can convey a ninth indication 424 and a tenth indication 426 to each of the front and rear drive units 104. Each of the front and rear drive units 104 can convey an eleventh indication 428 and twelfth indication 430 to the VDM 134, which may omit an indication of the condition. The condition resolver 112 can further provide an indication to the server system 132 (not depicted) including condition register information associated with the detection and resolution of the condition.

Figure 5:
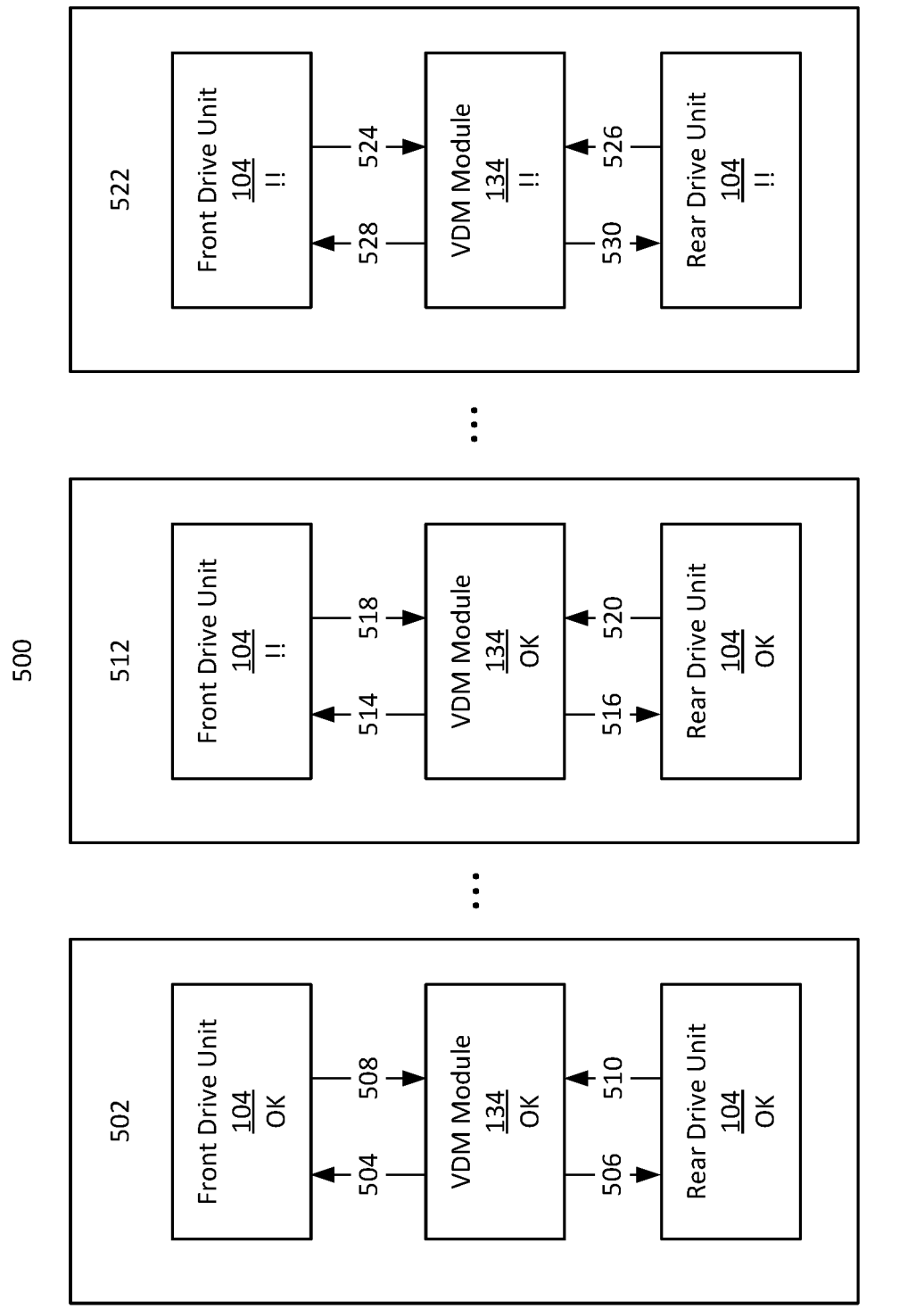
FIG. 5 depicts an example flow diagram for condition detection and resolution for various components of an electric vehicle.

FIG. 5 depicts an example flow diagram 500 for condition detection and resolution for various components of an electric vehicle. The flow diagram 500 depicts a condition resolution which indicates a non-maskable condition. A first time 502 can include vehicle operation prior to detection, such as the same operation as the first time 402 of FIG. 4. For example, the VDM 134 can provide a first indication 504 and second indication 506 for operation of the front and rear drive units 104. The front and rear drive units 104 can provide respective third indication 508 and forth indication 510 to the VDC module indicating the absence of a condition.

A second time 512 can include a detection of a condition at the front drive unit 104, such as the same condition as the second time 412 of FIG. 4. The energy limiter 110 can limit energy provided to the front drive unit 104. The VDM 134 can provide a fifth indication 514 and sixth indication 516 for operation of the front and rear drive units 104. The front and rear drive units 104 can provide respective seventh indication 518 and eighth indication 520 to the VDM 134, indicating the absence of a condition for each of the front and rear drive unit 104 (despite the detected condition).

At a third time 522, the condition resolver 112 can determine that the condition is non-maskable (e.g., that the overcurrent event is indicative of a short circuit). For example, the condition resolver 112 can receive settled sensor data, or the condition can reoccur after resetting or clearing a controller or portion thereof. Responsive to the resolution of the condition, the front drive unit 104 can provide a ninth indication 524 of the condition to the VDM 134. The rear drive unit 104 can provide a tenth indication 526 of an absence of a condition to the VDM 134. Responsive to the receipt of the indication of the condition, the VDM 134 can present an indication of the condition to a vehicle occupant, or take a further action, such as removing all power from all motors. For example, the VDM 134 can provide an eleventh indication 528 to the front drive unit 104 to reduce torque, and a twelfth indication 530 to the rear drive unit 104 to reduce torque. The condition resolver 112 or the VDM 134 can convey information corresponding to the condition to the server system 132.

Figure 6:
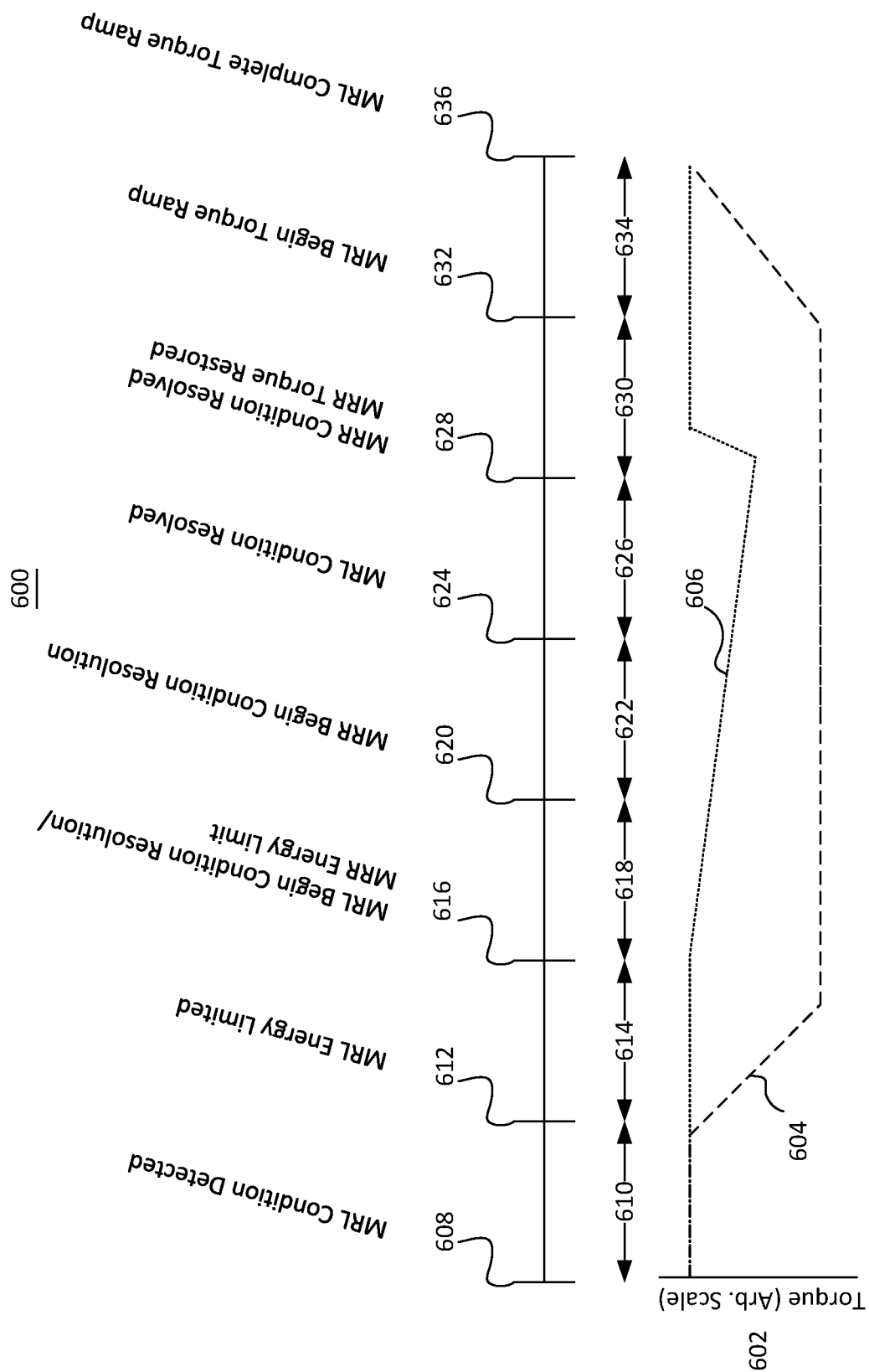
FIG. 6 depicts an example timeline corresponding to condition detection and resolution in an electric vehicle.

FIG. 6 depicts an example timeline 600 corresponding to condition detection and resolution in an electric vehicle. The example torque axis 602 can refer to or include condition detection for one or more front or rear motors of the electric vehicle, including, for example, a front right motor, front left motor, rear right motor or rear left motor. For example, torque axis 602 can depict MRL torque 604 of (e.g., generated by) the MRL and MRR torque 606 of (e.g., generated by) the MRR, corresponding to the timeline 600. The timeline 600 and the torque axis 602, like the other figures provided herein, are not intended to be drawn to scale. For example, the various depicted time periods can vary between microseconds, millisecond, or so forth. In general, the timeline can correspond to a detection of a condition (e.g., the condition of the second time 412, 512 of FIGS. 4 and 5), and the resolution of the condition (e.g., the resolution at the second time 512 of FIG. 5).

At a first time 608, the energy limiter 110 can receive a condition detected corresponding to a portion of a drive unit 104, such as a MRL. The condition can correspond to a detected condition such as an indication of desaturation a drive unit 104. However, a sensor 108 for the desaturation may not be fully settled, such that the indication may be indicative of electrical noise, and the drive unit 104 may not actually be in the desaturation condition. The energy limiter 110 can compare the condition to a condition-action LUT 126 to determine an action associated with the condition. The energy limiter 110 can execute the action. The action can include reducing torque provided for a motor, which can be performed by interfacing with a motor, battery, inverter, or other drive unit 104 component. The energy limiter 110 can execute the energy limit at a second time, 612, subsequent to the first time 608. Responsive to the energy limit, the MRL torque 606 can begin to decrease towards a limited value, such as zero Nm. A first time interval 610 between the first time 608 and the second time 612 can be less than a predetermined time limit for the action, such as a time to avoid deterioration of a condition (e.g., overheating winding by pushing current into a saturated device). The first time interval 610 can extend from the occurrence of the condition, the detection of the condition, or the receipt of the condition, by the energy limiter 110. For example, the first time interval 610 can be determined relative to a detection time of a sensor 108, or a receipt of the indication. The second time 612 can correspond to a state transition of the MRL into state 212.

At a third time 616, separated from the second time 612 by a second time interval 614, the energy limiter 110 can limit energy to the MRR. Responsive to the energy limit, the MRR torque 604 can begin to fall decrease towards a limited value, such as zero. The energy limit can correspond to a state transition of the MRL into state 212. The second time interval 614 can be less than a predetermined time interval associated with vehicle stability. For example, the second time can be about 5 milliseconds. Simultaneous to the application of the energy limit to the MRR, the condition resolver 112 can initiate a sequence to resolve the condition of the MRL. For example, the initiation can include requesting additional sensor readings, or resetting a controller, counter, accumulator, or the like. The initiation of the sequence can correspond to a state transition of the MRL into state 214. In some cases, the state transition of the MRL can precede or follow the energy limit applied to the MRR.

At a fourth time 620, separated from the third time 616 by a third time interval 618, the condition resolver 112 can initiate a sequence to resolve the condition of the MRR. For example, the initiation can include requesting additional sensor readings, or resetting a controller, counter, accumulator, or the like. The initiation of the sequence can correspond to a state transition of the MRR into state 214.

At a fifth time 624, separated from the fourth time 620 by a fourth time interval 622, the condition resolver 112 can resolve the condition of the MRL. For example, the condition resolution can be indicative of a non-maskable condition, which is then conveyed to the VDM 134. Such a reduction can be a result of further sensor data received, or an expiration of a predefined interval. For example, an expiration of a predefined interval may correspond to a maximum masking time such that an unresolved condition is conveyed to the VDM 134. As depicted, however, the condition can be resolved as a maskable condition (e.g., based on further sensor data), and the energy limiter 110 can remove the energy limit, causing the MRR torque 606 to return to a pre-limited level.

At a sixth time 628, separated from the fifth time 624 by a fifth time interval 626, the energy limiter 110 can remove an application of an energy limit. After the MRR torque is restored, the MRR torque can be ramped up. The current torque output of the motor can be within a threshold of a torque requested by the VDM 134. Thus, the reapplication of torque may not be intentionally slewed. The sixth time 628 may be determined in coordination with, for example, the fifth time 624 or the seventh time 632, such that a reapplication of torque to one or more wheels is conducted within a time interval of the reapplication of torque to the other wheel (e.g., synchronized with). For example, at the fifth time 624, the energy limiter 110 can delay a reapplication of energy to the MRL to be proximal to the reapplication of energy to the MRR.

At the seventh time 632, separated from the sixth time 628 by a sixth time interval 630, the energy limiter 110 can reapply energy to the MRL. The energy limiter 110 can reapply the energy over time, according to a torque ramp function such as a linear or non-linear slew-limited ramp, based on a predetermined value (the seventh interval 634) retrieved from the condition-action LUT (e.g., 5 milliseconds). Thus, after the seventh interval 634, at an eight time 636, the torque output of the motor can resume a requested torque from the VDM 134.

FIG. 7 depicts an example condition-action lookup table (LUT) 700. The LUT 700 can include various rows 702 corresponding to conditions associated with a motor. As depicted, the conditions can include a saturation of an inverter 706, a loss of CAN communications 708, or a loss of resolver data 710 such as a loss of signal loss of signal, delay of signal, or loss of track. Each row 702 can correspond to one or more columns 704. For example a maskability column 712 can indicate whether a condition is maskable, or one or more maskable criterion. For example, a maskable condition can be associated with a maximum time interval prior to conveying the indication to a VDC controller 134. The maximum time interval can be less than a predetermined time interval associated with vehicle stability (indicated as "fast" in column 712). Such fast maskable conditions can resolve the condition without communication with further motors (e.g., without a right motor communicating with a left motor). The maximum time interval can be greater than a predetermined time interval associated with vehicle stability (indicated as "slow" in column 712). Such slow maskable conditions can resolve the condition with communication with further motors, to prevent unbalanced acceleration between left and right or front and rear motors.

A slew column 714 can indicate a time or rate to reapply energy to a motor (e.g., to avoid vehicle instability). The slew can be defined relative to each condition, or relative to a difference in requested and current torque. A history or status bit column 716 can indicate a condition history. For example, the history or status bit can be a bit correlated to the condition register 122. The bit can indicate a present value of the condition, or a historical record, such as a condition prior to a vehicle restart. One or more history bits 716 can be cleared after a resolution of a condition resolver 112, or vehicle restart, for example. A maximum delay column 718 can indicate a maximum delay for a condition associated to be conveyed to the VDM 134. An action column 720 can indicate an action associated with the condition. The energy limiter 110 or condition resolver 112 can execute an action indicated by the action column. For example, the action column can include various energy limits, torque ramp downs, controller resets, or the like. When a desaturation event occurs, the action 720 can include or result in a reduction of the amount of power drawn from or provided by the battery.

Figure 8:
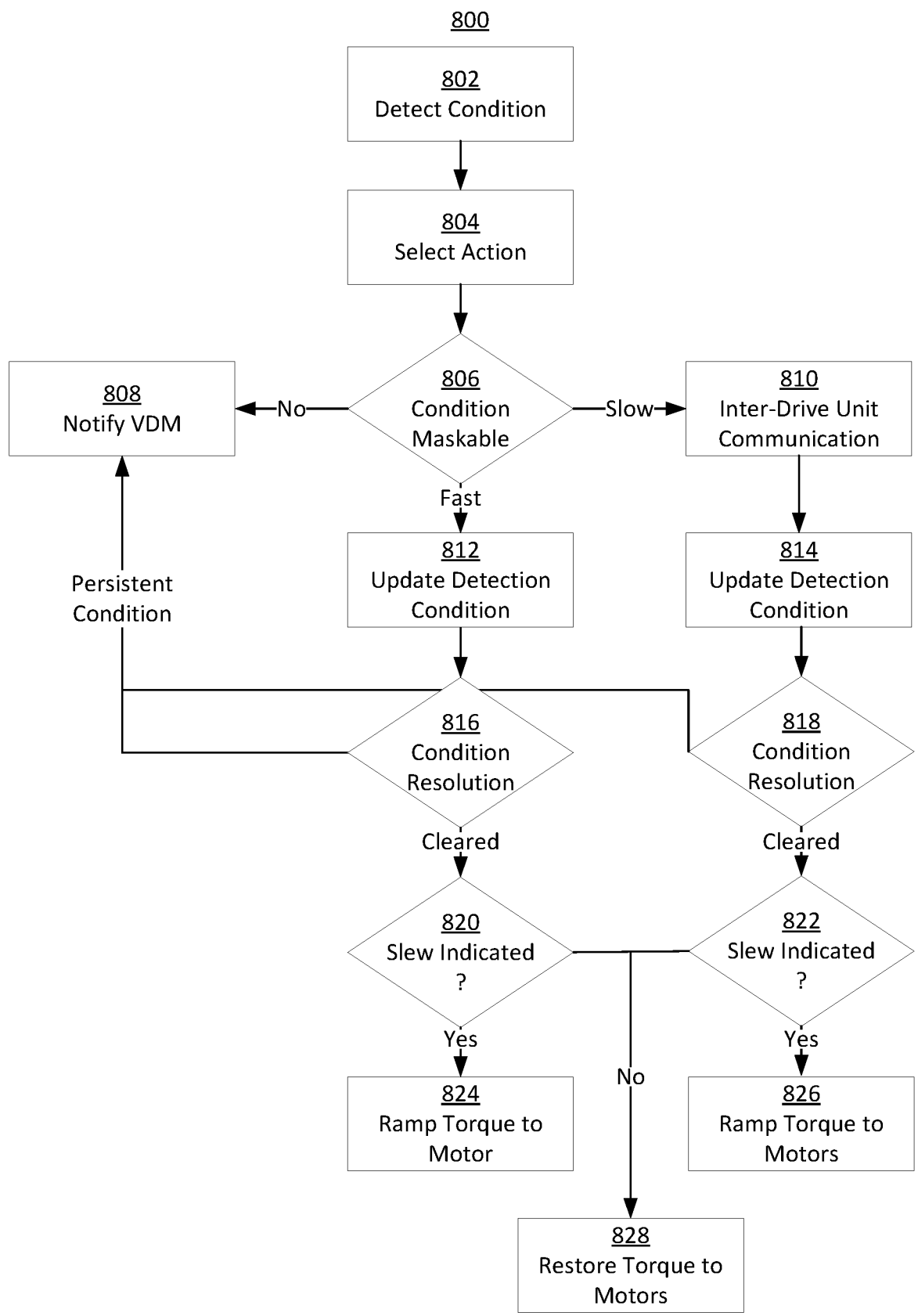
FIG. 8 depicts an example method of condition detection and resolution.

FIG. 8 depicts an example method 800 of condition detection and resolution. The method 800 can be performed by one or more systems or components depicted in FIG. 1, FIG. 3 or FIG. 9 including a data processing system 102 or an electric vehicle 300. For example, the method 800 can be performed by one or more processors of an electric vehicle 300 and a memory communicatively coupled thereto. At ACT 802, a vehicle sensor 108 detects a condition of a motor of the vehicle. The condition can be indicative of a noisy sensor, transient condition, or another condition such as a voltage, current, or thermal measurement.

At ACT 804, an energy limiter 110 limits an amount of torque of the motor for a time interval. The limit can be based on a condition and a mode of operation of the vehicle. For example, the action and condition can be based on a condition-action LUT 126, and can include limiting energy to an electric motor, or resolving a condition such as resetting a controller or receiving further sensor data. The action may further include a subsequent reapplication of torque, based on other determinations of the method (e.g., decision block 806)

At decision block 806, the condition resolver 112 determines whether the condition is maskable. For example, the determination can be based on the condition-action LUT 126. A maskability may be Boolean, or correspond to various maskable time intervals. Upon determining that the maskability is non-maskable, the method can proceed to ACT 808. The maskability can correspond to a "fast" reset and proceed to ACT 812. The maskability can correspond to a "slow" reset and proceed to ACT 810.

At ACT 808, the condition resolver 112 can provide an indication of the condition to a VDM 134. The VDM 134 can cause a further vehicle action or provide an indication of the condition to a vehicle occupant. The condition resolver 112 can provide further indications to further devices. For example, the condition resolver 112 can provide indications of the condition (or the resolution thereof) to a server system 132 at ACT 808, ACT 810, or ACT 812, or thereafter, such as where the VDC module is not notified of the condition.

At ACT 810, condition resolver 112 can communicate another motor of the electric vehicle to synchronize an action. For example, the communication can include an indication to limit torque, or determine a predetermined time or slew rate for the reapplication of torque.

At ACT 812 or ACT 814, the condition resolver 112 can update a detection condition. The updated condition can be based on subsequent sensor data after settling which may include a reset of one or more controllers or portions thereof. At decision block 816 or decision block 818, the condition resolver 112 can proceed to ACT 808 responsive to a condition resolution indicative of a persistent condition (e.g., settled sensor data that matches initial sensor data, indicating that the detected condition is not noise). The condition resolver 112 can proceed to decision block 820 or decision block 822 responsive to an indication that the condition resolution is indicative of a clearable condition such as sensor noise.

At decision block 820, the condition resolver 112 can determine whether a reapplication of energy to the motor should be slewed. Such a determination can be based on the condition-action LUT 126, a time elapsed since resolution, or a difference between a current torque and a torque requested from a VDM 134. The determination can depend on a current state of the VDM 134. For example, responsive to determining that the vehicle is in an apex of a turn, engaging in torque vectoring, or traveling above a speed threshold, the condition resolver 112 can determine that torque should be slewed. Responsive to an indication that the torque should be slewed, the method 800 can proceed to ACT 824. Responsive to an indication that the torque should not be slewed, the method 800 can proceed to ACT 828.

At decision block 822, the condition resolver 112 can provide synchronous communication with another electric motor to slew the reapplication of torque. Further, the condition resolver 112 can determine whether a reapplication of energy to the motor should be slewed. Such a determination can be based on the condition-action LUT 126, a time elapsed since resolution, or a difference between a current torque and a torque requested from a VDM 134. Responsive to an indication that the torque should be slewed, the method 800 can proceed to ACT 826. Responsive to an indication that the torque should not be slewed, the method 800 can proceed to ACT 828.

At ACT 824 or ACT 826, the condition resolver 112 can reapply energy to the motor. It is noted that the reapplication of torque may not be instantaneous due to limited current capacity, or impedance, for example, in a system. However, at ACT 824 or ACT 826, the rate of reapplication is not intentionally slewed. Thereafter, the vehicle can continue to operate in a same mode as prior to the clearance. For example, the mode of operation of the vehicle can continue to operate without perceptive change. At ACT 828, condition resolver 112 can reapply energy to the motor with an intentional slew limit, such as to avoid vehicle instability or excessive current draw. Thereafter, the vehicle can continue to operate in a same mode as prior to the clearance. For example, the mode of operation of the vehicle can continue to operate without perceptive change.

Figure 9:
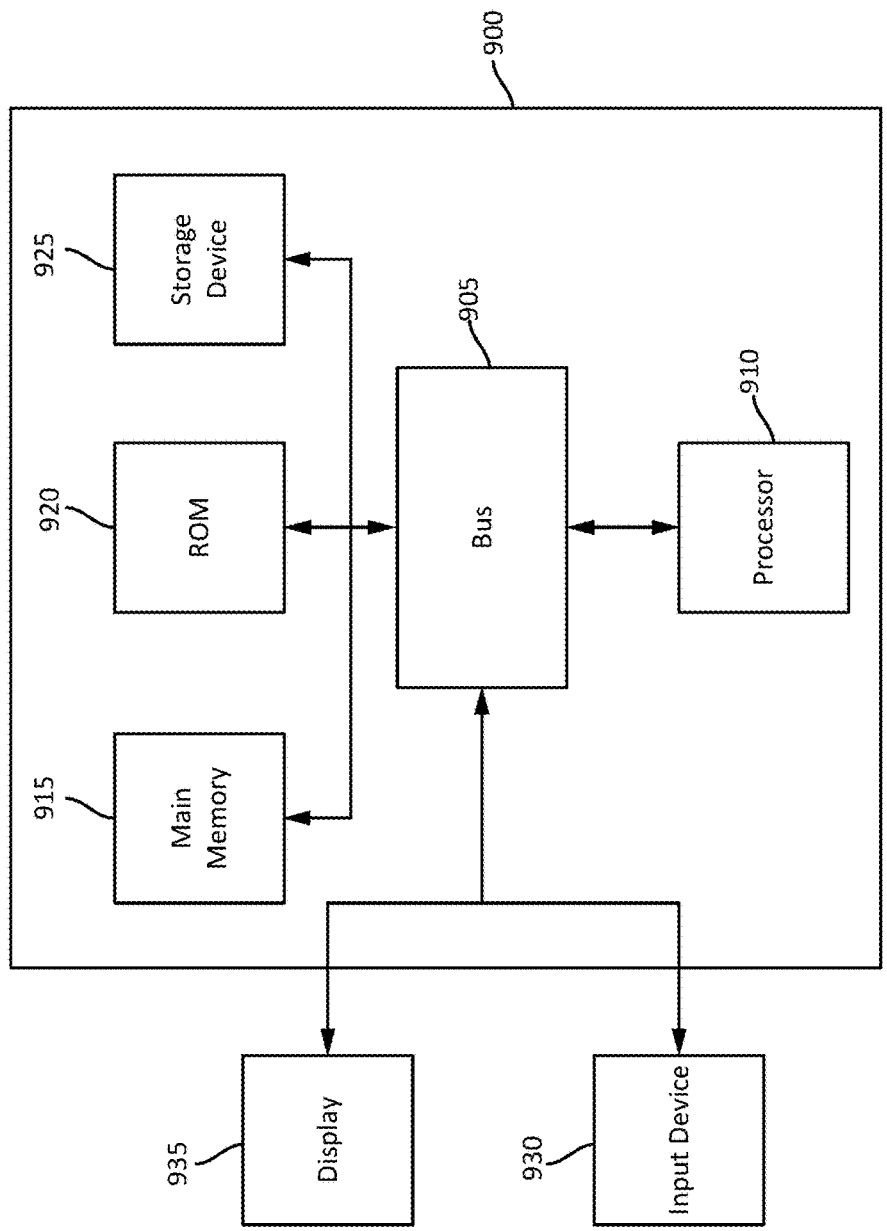
FIG. 9 is a block diagram illustrating an architecture for a computer system that can be employed to implement elements of the systems and methods described and illustrated herein.

FIG. 9 is a block diagram illustrating an architecture for a computer system that can be employed to implement elements of the systems and methods described and illustrated herein, including, for example, the systems depicted in FIG. 1 and FIG. 2, and the methods depicted in FIG. 3, FIG. 4 and FIG. 5. The computing system 900 includes at least one bus 905 or other communication component for communicating information and at least one processor 910 or processing circuit coupled to the bus 905 for processing information. The computing system 900 can also include one or more processors 910 or processing circuits coupled to the bus for processing information. The computing system 900 also includes at least one main memory 915, such as a random access memory (RAM) or other dynamic storage device, coupled to the bus 905 for storing information, and instructions to be executed by the processor 910. The main memory 915 can be used for storing information during execution of instructions by the processor 910. The computing system 900 may further include at least one read only memory (ROM) 920 or other static storage device coupled to the bus 905 for storing static information and instructions for the processor 910. A storage device 925, such as a solid state device, magnetic disk or optical disk, can be coupled to the bus 905 to persistently store information and instructions.

The computing system 900 may be coupled via the bus 905 to a display 935, such as a liquid crystal display, or active matrix display, for displaying information to a user such as a driver of the electric vehicle or other end user. An input device 930, such as a keyboard or voice interface may be coupled to the bus 905 for communicating information and commands to the processor 910. The input device 930 can include a touch screen display 935. The input device 930 can also include a cursor control, such as a mouse, a trackball, or cursor direction keys, for communicating direction information and command selections to the processor 910 and for controlling cursor movement on the display 935.

The processes, systems and methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. Hard-wired circuitry can be used in place of or in combination with software instructions together with the systems and methods described herein. Systems and methods described herein are not limited to any specific combination of hardware circuitry and software.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An electric vehicle, comprising:
one or more processors, coupled with memory, of the vehicle to:
detect, by a motor controller, a condition of a motor of the vehicle;
classify the condition as a type of condition, the type comprising at least one of a retriable condition or a non-retriable condition;
select, by a vehicle controller and based on the condition being a retriable condition and a mode of operation of the vehicle, an action to modify a level of energy provided to the motor, the action to reduce an amount of torque of the motor for a time interval, the time interval determined based on the condition being a retriable condition;
substitute, by the vehicle controller, an indication of the condition of the motor with an indication masking the detected condition;
perform the action to clear the condition of the motor without adjustment of the mode of operation of the vehicle; and
restore the indication of the condition prior to expiration of the time interval.

2. The electric vehicle of claim 1, comprising the one or more processors to:
determine the action clears the condition of the motor for a second time interval greater than a threshold; and
prevent, responsive to the determination that the action clears the condition for the second time interval greater than the threshold, transmission of a notification to a driver of the vehicle or a vehicle dynamics control module of the vehicle.

3. The electric vehicle of claim 1, comprising the one or more processors to:
determine the action clears the condition of the motor for a second time interval greater than a threshold; and
provide, to a server remote from the vehicle, a log of the condition and the action that clears the condition.

4. The electric vehicle of claim 1, comprising the one or more processors to:
determine the action fails to clear the condition of the motor for a second time interval greater than a threshold; and
provide, responsive to the determination that the action fails to clear the condition for the second time interval greater than the threshold, a notification of the condition to a driver of the vehicle or a vehicle dynamics control module of the vehicle.

5. The electric vehicle of claim 1, comprising the one or more processors to:
determine the action fails to clear the condition of the motor for a second time interval greater than a threshold; and
adjust, responsive to the determination that the action fails to clear the condition for the second time interval greater than the threshold, the mode of operation of the vehicle to a second mode of operation based on the condition of the motor.

6. The electric vehicle of claim 1, the one or more processors to:
determine, based on the type of the condition being retriable, to perform the action to clear the condition without adjustment of the mode of operation, without provision of a notification of the condition to a driver of the vehicle, and without transmission of an indication of the condition to a vehicle dynamics control module of the vehicle.

7. The electric vehicle of claim 1, the one or more processors to:
detect a second condition of the motor of the vehicle; and
determine, based on the type of the second condition being non-retriable and without selection of any action to clear the condition, to provide a notification to a driver of the vehicle of the condition and provide an indication of the condition to a vehicle dynamics control module of the vehicle.

8. The electric vehicle of claim 1, comprising the one or more processors to:
   determine a first state of a state machine prior to detection of the condition;
   determine the action clears the condition of the motor; and
   maintain, responsive to the determination that the action clears the condition of the motor, the first state of the state machine.

9. The electric vehicle of claim 1, comprising the one or more processors to:
   determine, based on the type of the condition, a duration for the action; and
   perform the action for the duration responsive to the type of the condition.

10. The electric vehicle of claim 1, comprising the one or more processors to:
    identify a second motor on an axle of the motor;
    determine the second motor lacks the condition of the motor; and
    perform the action on the second motor synchronously with performance of the action on the motor.

11. The electric vehicle of claim 1, comprising the one or more processors to:
    apply, subsequent to performance of the action, a ramp function to increase the amount of torque of the motor to prevent adjustment of the mode of operation of the vehicle.

12. A method, comprising:
    detecting, by a motor controller of a vehicle, a condition of a motor of the vehicle;
    classifying, by one or more processors coupled with memory of the vehicle, the condition as a type of condition, the type comprising at least one of a retriable condition or a non-retriable condition;
    selecting, by a vehicle controller of the vehicle and, based on the condition being a retriable condition and a mode of operation of the vehicle, an action to modify a level of energy provided to the motor, the action to reduce an amount of torque of the motor for a time interval, the time interval determined based on the condition being a retriable condition;
    substituting, by the vehicle controller, an indication of the condition of the motor with an indication masking the detected condition; and
    performing, by the one or more processors, the action to clear the condition of the motor without adjustment of the mode of operation of the vehicle.

13. The method of claim 12, comprising:
    determining, by the one or more processors, the action clears the condition of the motor for a second time interval greater than a threshold; and
    preventing, by the one or more processors, responsive to the determination that the action clears the condition for the second time interval greater than the threshold, transmission of a notification to a driver of the vehicle or a vehicle dynamics control module of the vehicle.

14. The method of claim 12, comprising:
    determining, by the one or more processors, the action clears the condition of the motor for a second time interval greater than a threshold; and
    providing, by the one or more processors to a server remote from the vehicle, a log of the condition and the action that clears the condition.

15. The method of claim 12, comprising:
    determining, by the one or more processors, the action fails to clear the condition of the motor for a second time interval greater than a threshold; and
    providing, by the one or more processors, responsive to the determination that the action fails to clear the condition for the second time interval greater than the threshold, a notification of the condition to a driver of the vehicle or a vehicle dynamics control module of the vehicle.

16. The method of claim 12, comprising:
    determining, by the one or more processors, the action fails to clear the condition of the motor for a second time interval greater than a threshold; and
    adjusting, by the one or more processors, responsive to the determination that the action fails to clear the condition for the second time interval greater than the threshold, the mode of operation of the vehicle to a second mode of operation based on the condition of the motor.

17. The method of claim 12, comprising:
    determining, by the one or more processors based on the type of the condition being retriable, to perform the action to clear the condition without adjustment of the mode of operation, without provision of a notification of the condition to a driver of the vehicle, and without transmission of an indication of the condition to a vehicle dynamics control module of the vehicle.

18. The method of claim 12, comprising:
    detecting, by the one or more processors, a second condition of the motor of the vehicle; and
    determining, by the one or more processors, based on the type of the second condition being non-retriable and without selection of any action to clear the condition, to provide a notification to a driver of the vehicle of the condition and provide an indication of the condition to a vehicle dynamics control module of the vehicle.

* * * * *